United States Patent
Drewes et al.

(10) Patent No.: US 7,448,274 B2
(45) Date of Patent: Nov. 11, 2008

(54) PRESSURE SENSOR HAVING A PRESSURE MEASURING CELL WITH A PLATFORM AND A MEASURING MEMBRANE

(75) Inventors: Ulfert Drewes, Müllheim (DE); Karl Floegel, Schopfheim (DE); Frank Hegner, Lörrach (DE); Thomas Uehlin, Schopfheim (DE); Rainer Martin, Efringen-Kirchen (DE)

(73) Assignee: Endress + Hauser Conducta Gesellschaft fur Mess- u. Regeltechnik mbH + Co. KG, Gerlingen (DE)

( * ) Notice: Subject to any disclaimer, the term of this patent is extended or adjusted under 35 U.S.C. 154(b) by 0 days.

(21) Appl. No.: 10/566,364

(22) PCT Filed: Jul. 16, 2004

(86) PCT No.: PCT/EP2004/007975

§ 371 (c)(1),
(2), (4) Date: Jul. 17, 2006

(87) PCT Pub. No.: WO2005/012865

PCT Pub. Date: Feb. 10, 2005

(65) Prior Publication Data
US 2007/0028696 A1    Feb. 8, 2007

(30) Foreign Application Priority Data
Jul. 29, 2003    (DE) .............................. 103 34 854

(51) Int. Cl.
*G01L 7/00*    (2006.01)
(52) U.S. Cl. .......................................... 73/700; 73/715
(58) Field of Classification Search ........... 73/700–756; 361/283.1–283.4
See application file for complete search history.

(56) References Cited

U.S. PATENT DOCUMENTS

| | | | |
|---|---|---|---|
| 6,615,665 B1 * | 9/2003 | Flogel et al. | 73/715 |
| 6,681,637 B2 * | 1/2004 | Jacob et al. | 73/708 |
| 6,698,294 B2 * | 3/2004 | Jacob et al. | 73/708 |
| 6,715,356 B2 * | 4/2004 | Gerst et al. | 73/715 |
| 6,978,678 B2 * | 12/2005 | Lohmeier et al. | 73/721 |

FOREIGN PATENT DOCUMENTS

| | | |
|---|---|---|
| DE | 42 34 290 A1 | 4/1994 |
| DE | 44 07 212 C1 | 8/1995 |
| DE | 196 28 551 A1 | 2/1997 |
| DE | 101 06129 | 1/2003 |
| EP | 0 403 257 B1 | 12/1990 |
| EP | 0 723 143 A1 | 7/1996 |
| EP | 0 757 237 A2 | 2/1997 |
| EP | 0 995 979 A1 | 4/2000 |

* cited by examiner

*Primary Examiner*—Andre J. Allen
*Assistant Examiner*—Jermaine Jenkins
(74) *Attorney, Agent, or Firm*—Bacon & Thomas, PLLC

(57) ABSTRACT

A pressure sensor including: A pressure measuring cell having an end face loadable with the medium; a housing having a media opening and a ring-shaped, axial bearing surface, which surrounds the media opening; a clamping apparatus; and a ring-shaped sealing arrangement. The pressure measuring cell is positioned in the housing and the sealing arrangement is positioned between the bearing surface and the end face, and the sealing arrangement, as well as the pressure measuring cell, are axially clamped between the bearing surface and the clamping apparatus. The sealing arrangement includes, a decoupling ring, as well as a first and a second, ring-shaped sealing element. The first sealing element lies against the end face, the second sealing element lies against the bearing surface, and the decoupling ring is axially clamped between the first and the second sealing elements.

14 Claims, 3 Drawing Sheets

PRESSURE SENSOR HAVING A PRESSURE MEASURING CELL WITH A PLATFORM AND A MEASURING MEMBRANE

FIELD OF THE INVENTION

The present invention relates to a pressure sensor for measuring Pressure of a medium.

BACKGROUND OF THE INVENTION

Especially in the case of pressure sensors that are used in aggressive chemicals, the sealing between the pressure measuring cell and the media opening of the sensor housing proves to be problematic, since the usual elastic O-rings either can not be used, or can be used only with limitations. Instead, PTFE seals are applied. While PTFE has the desired chemical stability, it is accompanied by mechanical problems. Thus, PTFE does not have sufficient elasticity and it even flows under pressure. Kathan et al. disclose in Publication DE 19628255 A1 a pressure measuring device, in which a ring-shaped gasket of PTFE is axially clamped between the media-facing surface of the pressure measurement cell and an axial bearing surface of the sensor housing, with the axial bearing surface having resilient properties. This attempted solution leads, however, to temperature hysteresis errors, since the coefficient of thermal expansion of the steel housing differs greatly from that of the ceramic measuring cell and this directly affects the measuring membrane of the measuring cell. Flögel et al. manage, to some extent, to provide a remedy in the teachings of Publication DE 101 06 129 A1, for the sensor proposed there has, in the region of the media opening of the housing, a relatively massive Kovar ring, which supports the axial bearing surface, whereby an approximation of the effective coefficient of thermal expansion of the axial bearing surface is supposed to be obtained. Although this perhaps achieves the desired approximation of the coefficient of thermal expansion, now temperature stresses can be expected between the steel parts of the housing and the Kovar ring, which can still get back to affect the measuring cell.

SUMMERY OF THE INVENTION

An object of the invention is, therefore, to provide a pressure sensor, which overcomes the recited disadvantages of the state of the art. This object is solved according to the invention by the pressure sensor which includes: A pressure measuring cell having an end face loadable with the medium; a housing having a media opening and a ring-shaped, axial bearing surface, which surrounds the media opening; a clamping apparatus; and a ring-shaped sealing arrangement; wherein the pressure measuring cell is positioned in the housing and the sealing arrangement is positioned between the bearing surface and the end face, and the sealing arrangement, as well as the pressure measuring cell, are axially clamped between the bearing surface and the clamping apparatus; characterized in that the sealing arrangement includes a decoupling ring as well as first and second, ring-shaped, sealing elements, the first sealing element lies against the end face, the second sealing lies against the bearing surface, and the decoupling ring is axially clamped between the first and second sealing elements.

The term "ring-shaped" is meant to include not only circular rings, but, also, any ring having a closed path around an opening. These can have, among others, also an oval, rectangular, hexagonal, or any other polygonal shape.

The pressure measuring cell can include a platform and a measuring membrane, or diaphragm, of a first material, which can be, for example, a ceramic, especially corundum, or a crystalline material. The decoupling ring should, preferably, be manufactured from a material, whose mechanical and/or thermal properties essentially approximate, or equal, those of the first material. This can be achieved, for example, by manufacturing the decoupling ring likewise from the first material.

The decoupling ring is preferably so embodied that radial forces, which can arise between the decoupling ring and the axial bearing surface due to thermal expansion differences, lead, in any case, only to negligible deformations of the decoupling ring. This can be achieved, for example, by a certain stiffness, and, on the other hand, by the use of a decoupling ring having two planparallel end faces. In the way, thermal expansion differences between the axial bearing surface and the decoupling ring essentially lead exclusively to shear forces, which are, to the greatest possible extent, relieved by deformations of the second sealing element.

It is permissible to provide projections and/or cavities on the end faces, which can be, for example, ring-shaped, for the purpose of limiting flow of the sealing elements under load. This is especially to be considered, when the first and/or the second sealing element(s) involve(s) a material such as PTFE, especially in form the form of a flat seal, i.e. a gasket. In some cases, it can also be advisable to use O-rings as sealing elements. In this case, in each instance, at least one of the end faces, between which the O-rings are clamped, should have the requisite form of an O-ring bed.

In a currently preferred embodiment of a pressure sensor of the invention, the clamping apparatus and/or the housing includes an axially elastic element. This axially elastic element can be, among other things, a Belleville spring, which forms, or is integrated in, for example, the axial bearing surface, a corrugated tube membrane, or diaphragm, integrated into the media opening, as well as a spring, e.g. a helical spring, or a Belleville spring, axially clamped between the rear side of the pressure measuring cell and a clamping ring.

The elastic element assures sufficient elasticity that the sealing elements are, in the case of pressure fluctuations, and pressure shocks, or spikes, of the medium, as well as in the case of temperature fluctuations of the pressure sensor, only subjected to such fluctuations of the axial clamping pressure, as do not compromise the sealing effect. Additionally, the elastic element serves to compensate for settling, or plastic deformation, of the sealing elements under load. The elasticity is preferably so selected that the axial clamping pressure on the first and second sealing elements does not, over temperature cycles between −40° C. and 150° C., fluctuate by more than 50%, more preferably by more than 25%, and especially preferably by not more than 12%, of the maximum occurring clamping pressure.

Furthermore, it is currently preferred that the axial clamping pressure on the first and second sealing elements does not, over temperature cycles between −40° C. and 150° C., sink below 0.8 MPa, preferably below 0.9 MPa, and especially preferably below 1 MPa.

BRIEF DESCRIPTION OF THE DRAWINGS

The invention will now be described on the basis of the appended drawings, the figures of which show as follows.

DESCRIPTION OF THE PREFERRED EMBODIMENTS

The pressure sensors shown in FIGS. 1-4 include a cylindrical, ceramic, pressure measuring cell, for example of corundum, operating using the capacitive measurement principle. Of course, also any other pressure measuring cells can be used, for example those utilizing pressure-dependent resonators or resistors. The pressure measuring cells are, in the illustrated examples of embodiments, in each case, axially clamped, in different ways, in a housing.

Figure 1:
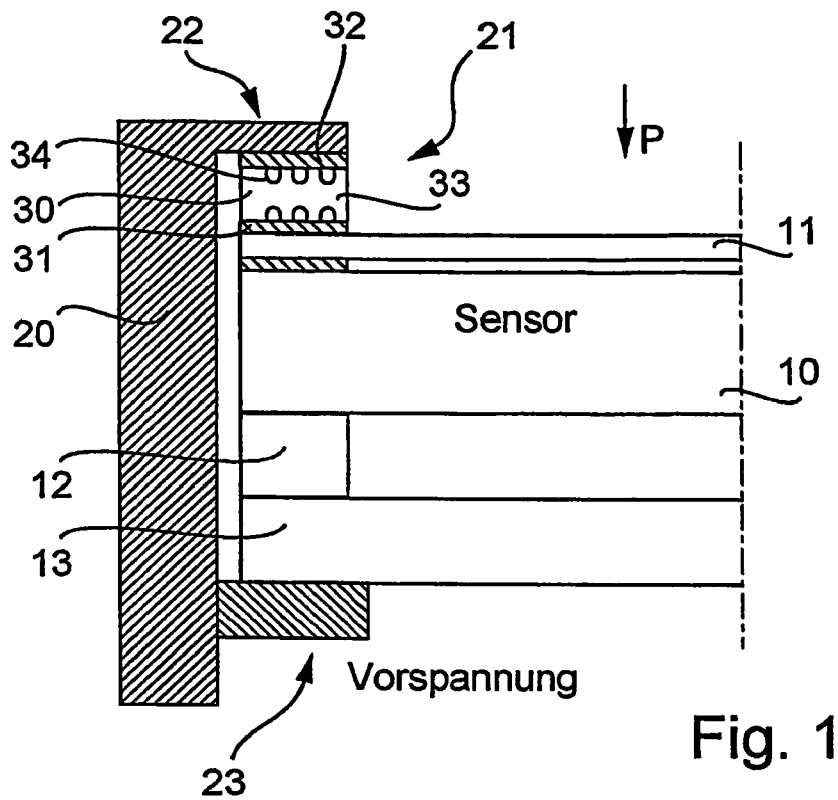
FIG. 1 a longitudinal section through a first example of an embodiment of a pressure sensor of the invention.

The pressure sensor shown in FIG. 1 includes a pressure measuring cell having a platform 10 and a measuring membrane 11. The pressure measuring cell is arranged in a housing 20, with the housing 20 including a media opening 21, through which the measuring membrane 11 of the pressure measuring cell is loadable with a media pressure. The housing 20 is of a metal material, which is preferably corrosion resistant, for example a high grade, or stainless, steel. Housing 20 includes a ring-shaped, radially inwardly extending shoulder, which surrounds the media opening, and which defines an axial bearing surface 22. The ring-shaped shoulder has characteristics of a Belleville spring, so that the axial bearing surface 22 is axially elastic. Within the housing, a threaded ring 23 is arranged. The thread is provided on the outer, lateral surface of ring 23 and it engages in an internal thread on the inner diameter of the housing 20. The pressure measuring cell is clamped in place by clamping pressure exerted on its rear face and originating from the threaded ring 23, with the pressure measuring cell pressing with the measuring membrane 11 against a ring-shaped sealing arrangement 30, such that the sealing arrangement 30 is axially clamped between the measuring membrane 11 and the axial bearing surface 22 in such a manner that the interior of the housing is sealed at the media opening 21. Due to the elasticity of the axial bearing surface 22, the different length changes of pressure measuring cell and housing arising with temperature fluctuations can be accommodated without unacceptable fluctuations in the axial clamping forces. Preferably, the axial elasticity also enables the accommodation of possibly present unevenness of the functional surfaces, i.e. the surfaces between which the sealing elements are clamped.

Sealing arrangement 30 comprises essentially a decoupling ring 33, which is made of a ceramic material, especially corundum. The decoupling ring 30 includes, preferably, two planparallel, end faces 31, 32, by means of which a first ring-shaped sealing element 31 and a second ring-shaped sealing element 32 are pressed, respectively, against the pressure measuring cell, and against the axial bearing surface 22. The end faces can have structural elements for limiting the radial movement of the sealing elements 31, 32, especially the cold flow of PTFE sealing elements under pressure. Currently preferred as sealing elements are flat seals, i.e. gaskets, especially gaskets of PTFE. Preferably, the radial extent of the gaskets, thus the distance between the inner and outer radii thereof, amounts to greater than ten-times the gasket material thickness in the axial direction.

The clamping force for the PTFE gaskets is, for example, so selected that, over the entire temperature range of the pressure sensor, the axial clamping pressure does not subceed, or fall below, 0.8 MPa, preferably 0.9 MPa and especially preferably 1 MPa.

The pressure measuring cell in FIG. 1 has, additionally, a rear-side stiffening plate 13 and a rear-side stiffening ring 12. Stiffening ring 12 is arranged between platform 10 and the stiffening plate. The axial clamping forces are transmitted from the threaded ring 23, through the rear-side stiffening plate 13 and the rear-side stiffening ring 12 to the platform 10 of the pressure measuring cell. Although, with this construction, radial deformations in the membrane region due to axial clamping forces and hysteresis errors due to the support with the threaded ring can be decreased, nevertheless the stiffening plate and the stiffening ring are not absolutely necessary for putting the present invention into practice. Details concerning the stiffening plate are disclosed in the unpublished patent application 10243079 of Endress+Hauser.

Figure 2:
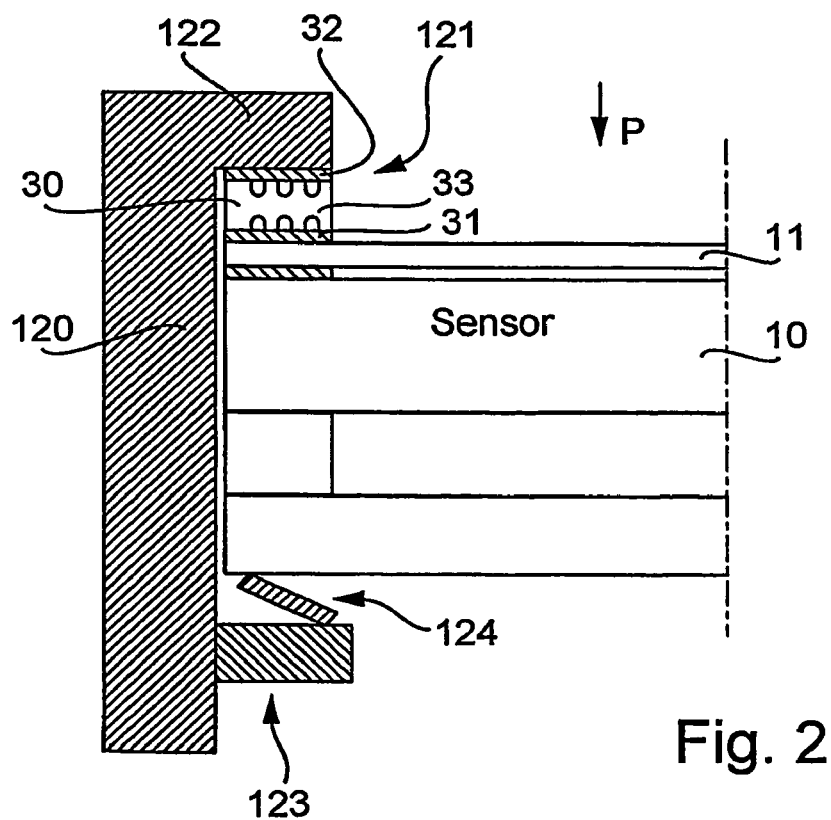
FIG. 2 a longitudinal section through a second example of an embodiment of a pressure sensor of the invention.

In the case of the example of an embodiment shown in FIG. 2, which follows essentially the above-explained principles of construction, the following differences compared with the pressure sensor of FIG. 1 are to be mentioned.

The pressure sensor has a housing 120 with an axially stiff, radially inwardly extending shoulder, which bounds a media opening 121. Formed on the shoulder is an axial bearing surface 122, against which a pressure measuring cell with a platform 10 and a measuring membrane 11 is axially clamped by means of a threaded ring 123. A sealing arrangement 30 is, as above described, clamped between the pressure measuring cell and the axial bearing surface 122.

The axial elasticity for assuring a sufficiently constant clamping force is, in this case, assured by an elastic element, for example a spring ring 124 or a Belleville spring, with the elastic element being clamped between the rear-side of the pressure measuring cell and the threaded ring 123. In the dimensioning of the elastic element, a design consideration is that the elastic element must absorb overloading pressure shocks, without the seals being excessively unloaded.

Figure 3:
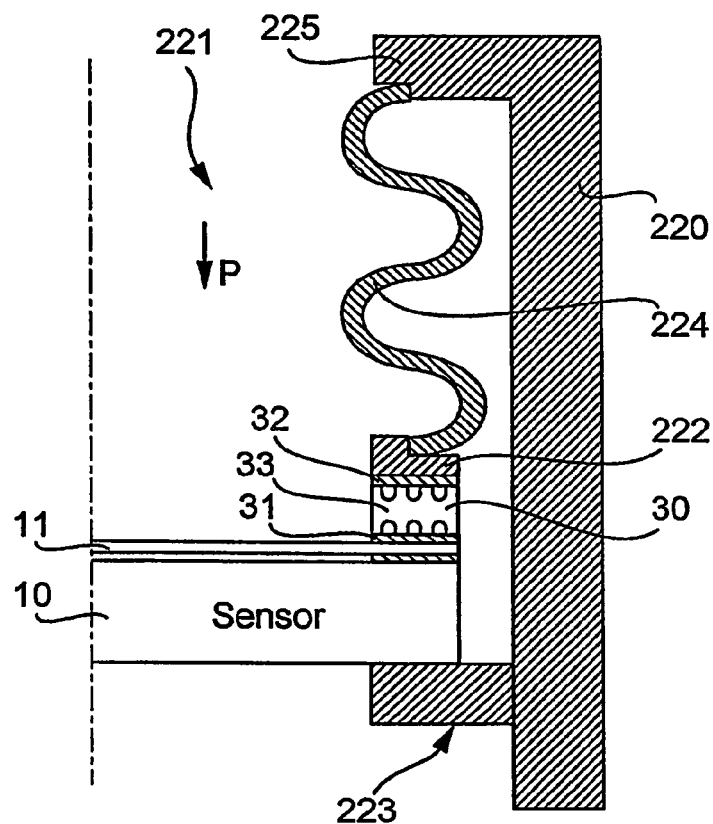
FIG. 3 a longitudinal section through a third example of an embodiment of a pressure sensor of the invention.

The example of an embodiment shown in FIG. 3 includes a housing 220, with a media opening 221, which is bounded by a corrugated tube membrane 224. The corrugated tube membrane 224 is secured pressure-tightly at its first end to the housing 220 and it carries on its second end a ring member, which has an axial bearing surface 222. A pressure measuring cell is axially clamped between a threaded ring 223 and the axial bearing surface 222, wherein, as described above, a sealing arrangement 30 is located between the measuring membrane 11 of the pressure measuring cell and the axial bearing surface 222. The corrugated tube membrane 224 is to be dimensioned such that it assures the required axial bearing pressure for all operating temperatures and media pressure levels. Additionally, the corrugated tube membrane can be so embodied that the axial clamping pressure remains approximately constant in the face of changing operating pressures.

Figure 4:
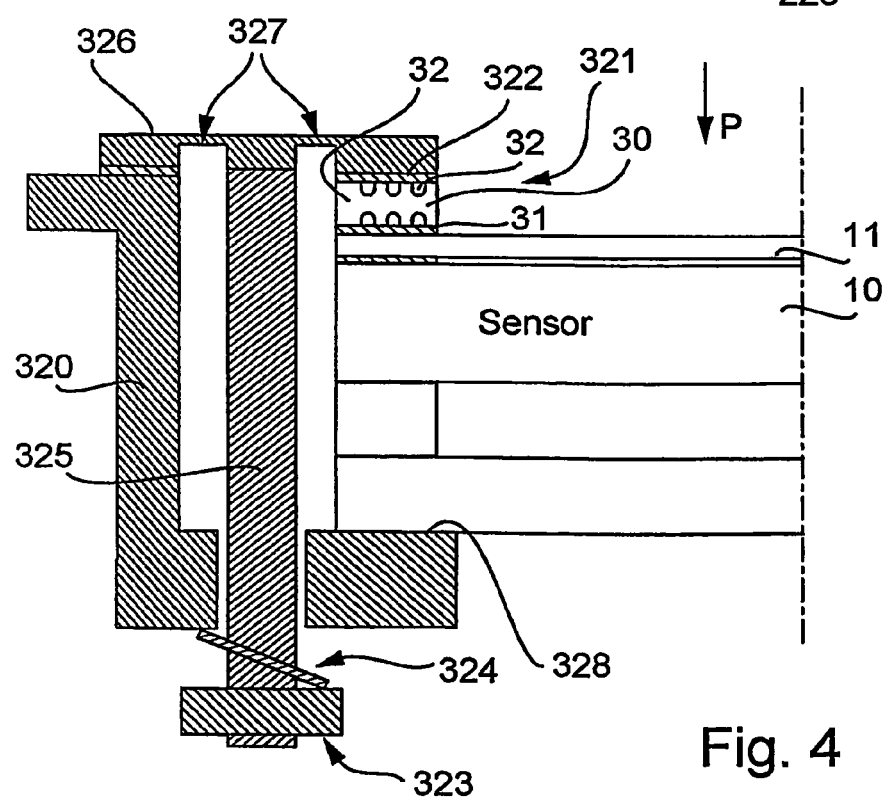
FIG. 4 a longitudinal section through a fourth example of an embodiment of a pressure sensor of the invention.

FIG. 4 shows a variant, in which a housing 320 has a media opening 321, which is bounded by a front-side clamping ring 326 having a front-side, axial bearing surface 322. The front-side clamping ring has a plurality of tensioning bolts, which are distributed at uniform spacings over the surface of the ring and extend through corresponding openings of the housing 320, to the rear-side of the housing, where they are secured with nuts 323, in order to clamp the measuring cell between a rear-side, axial bearing surface 328 of the housing 320 and the front-side axial bearing surface 322. For assuring sufficient elasticity, there is, on the one hand, an axially elastic, spring ring 324 on the rear side of the housing. On the other hand, the front-side clamping ring 326 can have ring-shaped cavities 327, in order to effect, by a controlled weakening of the material, an axial elasticity. Of course, the two alternatives are usable singly or, as shown, in combination.

Figure 5:
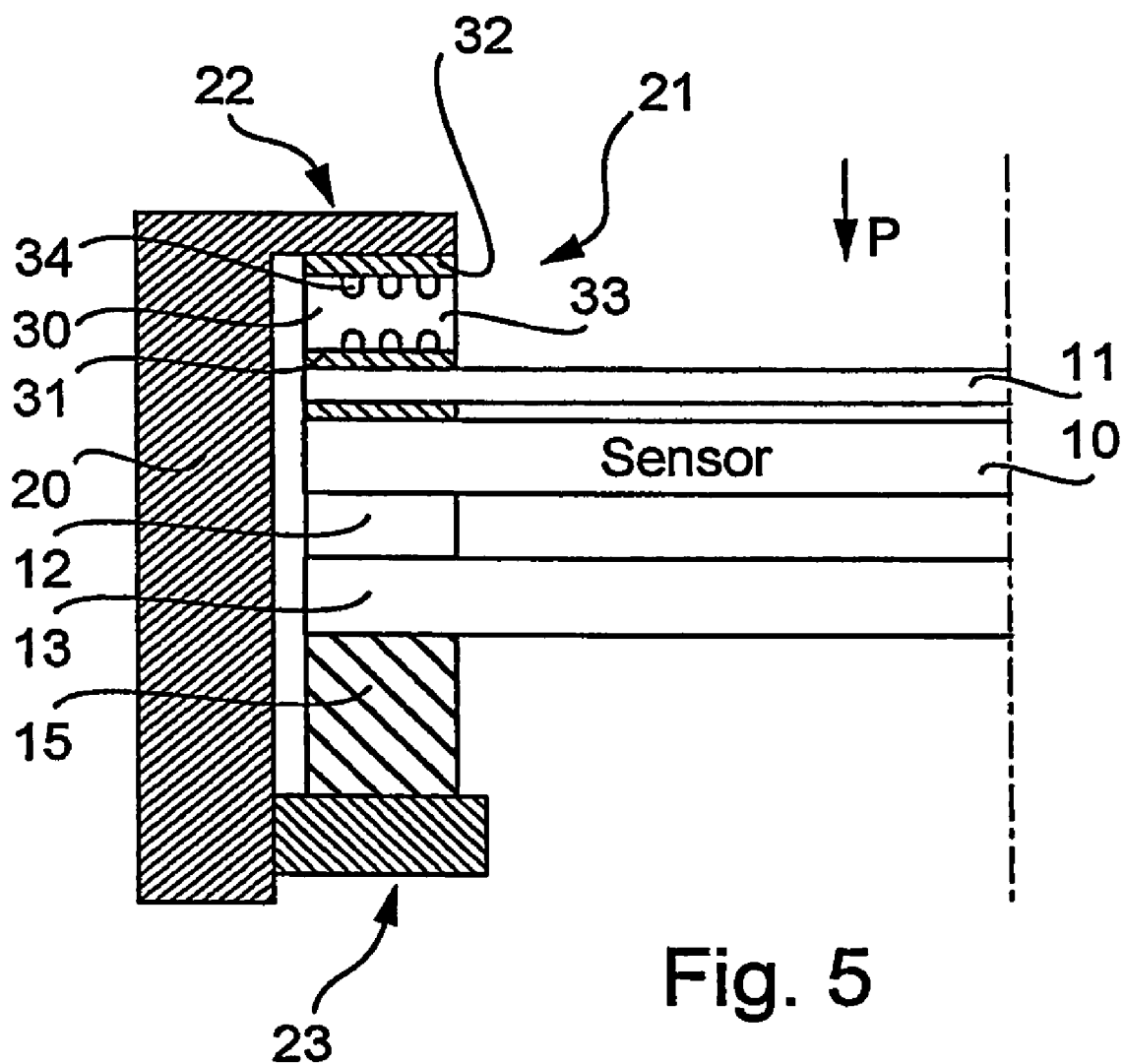
FIG. 5 a longitudinal section through a fifth example of an embodiment of a pressure sensor of the invention.

The example of an embodiment shown in FIG. 5 differs in the following ways from the example of an embodiment presented in FIG. 1. Between the stiffening plate 13 on the rear side of the pressure measuring cell and the threaded ring 23 is an additionally inserted, axially clamped, compensation ring 15. The compensation ring is manufactured of a material having a greater thermal expansion difference than the stainless steel housing 20. In this way, differences between the length expansion of the ceramic pressure measuring cell and the housing in the case of temperature fluctuations can be completely, or partially, made up. Suitable materials for the compensation ring are, for example, Al, Mg, Zn, and other materials, whose coefficients of thermal expansion are markedly greater than that of the material of the housing 10. This embodiment can, as required, soften the demands on the axial elasticity of the bearing surfaces.

The invention claimed is:

1. A pressure sensor for measuring a pressure of a medium, comprising:
   A pressure measuring cell having an end face loadable with the medium;
   a housing having a media opening and a ring-shaped, axial bearing surface surrounding the media opening;
   a clamping apparatus; and
   a ring-shaped sealing arrangement; wherein
   said pressure measuring cell is positioned in said housing and said sealing arrangement is positioned between said bearing surface and said end face, said sealing arrangement, as well as said pressure measuring cell are axially clamped between said bearing surface and said clamping apparatus; and
   said sealing arrangement includes a decoupling ring as well as a first, and a second, ring-shaped sealing element, said first sealing element lies against said end face, said second sealing element lies against said bearing surface, and said decoupling ring is axially clamped between said first sealing element and said second sealing element.

2. The pressure sensor as claimed in claim 1, wherein:
said pressure measuring cell has a platform, and a measuring membrane, of a first material, said decoupling ring is made of a second material; and the mechanical and/or thermal properties of said first material equal those of said second material.

3. The pressure sensor as claimed in claim 2, wherein:
said first material and said second material are equal.

4. The pressure sensor as claimed in claim 2, wherein:
said first material comprises a ceramic, especially corundum, or a crystalline material.

5. The pressure sensor as claimed in claim 2, wherein:
said first and/or said second sealing element comprise(s) an inert material, especially PTFE.

6. The pressure sensor as claimed in claim 1, wherein:
said decoupling ring is bounded in the axial direction by two planparallel end faces.

7. The pressure sensor as claimed in claim 6, wherein:
said end faces have ring-shaped projections and/or cavities.

8. The pressure sensor as claimed in claim 1, wherein:
said clamping apparatus and/or said housing includes an axially elastic element.

9. The pressure sensor as claimed in claim 8, wherein:
the axial clamping pressure on said first and second sealing elements does not, over temperature cycles between −40° C. and 150° C., sink below 0.8 MPa, preferably not below 0.9 MPa and especially preferably not below 1 MPa.

10. The pressure sensor as claimed in claim 8, wherein:
said axially elastic element comprises a Belleville spring having the axial bearing surface.

11. The pressure sensor as claimed in claim 8, wherein:
said axially elastic element is embodied as an axially flexible, corrugated tube membrane surrounding the media opening;
said corrugated tube membrane has at a first axial end the axial bearing surface; and
said corrugated tube membrane is connected pressure-tightly with said housing at a process connection and at a second end.

12. The pressure sensor as claimed in claim 1, further comprising:
a compensation ring, which is axially clamped together with the pressure measuring cell, wherein:
said compensation ring has a greater coefficient of thermal expansion than the material of said housing, and said pressure measuring cell has a smaller coefficient of thermal expansion than the material of said housing.

13. The pressure sensor as claimed in claim 12, wherein:
the axial clamping pressure on said first and second sealing elements fluctuates over temperature cycles between −40° C. and 150° C. by not more than 40%, preferably by not more than 20% and especially preferably by not more than 10% of the maximum occurring clamping pressure.

14. The pressure sensor as claimed in claim 12, wherein:
said compensation ring comprises zinc, magnesium or aluminum.

* * * * *